UNITED STATES PATENT OFFICE.

ALBERT R. MERZ, OF WASHINGTON, DISTRICT OF COLUMBIA.

PROCESS FOR RENDERING WATER-SOLUBLE THE POTASH IN CEMENT-MILL DUST.

1,288,437.  Specification of Letters Patent.  Patented Dec. 17, 1918.

No Drawing.  Application filed November 19, 1917.  Serial No. 202,741.

(DEDICATED TO THE PUBLIC.)

*To all whom it may concern:*

Be it known that I, ALBERT R. MERZ, a citizen of the United States of America, and an employee of the Department of Agriculture of the said United States, residing at Washington, in the District of Columbia, (whose post-office address is Department of Agriculture, Washington, D. C.,) have invented a new and useful Process for Rendering Water-Soluble the Potash in Cement-Mill Dust.

This application is made under the Act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

The dust from the kilns of Portland cement mills has been recovered for several reasons; such as, to abate the dust nuisance and avoid resultant litigation, to reclaim the dust for re-use in the raw mix fed for its potash content or as a source of potash salts. The dust, as recovered contains soluble potash salts, calcium oxid, calcium carbonate and various silicates including potash-containing silicates.

At Portland cement mills that use coal for fuel to burn their cement the dust which they recover for its potash content contains considerable proportions of the potash in a form of combination which is not readily water-soluble and consequently cement manufacturers are unable to secure compensation for this potash when the dust is sold to the fertilizer trade. This "recombined" potash, as it is called, may form as much as 50 per cent. or more of the total potash in dust from certain plants.

Now I have found that when dust containing such "recombined" potash is heated in an oxidizing atmosphere out of contact with coal, this potash is rendered in large part water-soluble. Thus when a cement dust containing 11.4 per cent. total potash and 6.8 per cent. water-soluble potash was thus ignited at 1000° the water-soluble potash was increased to 10.62 per cent. on the basis of the original dust. Similarly another dust containing 7.02 per cent. total potash and 2.93 per cent. water soluble potash had its water-soluble potash increased to 5.15 per cent. on the basis of the original dust by ignition in this manner for 40 minutes at 1000°.

I have found that such increase of water-soluble potash can be secured at temperatures as low as 600° and at various temperatures above this up to 1100°. Beyond this temperature volatilization of the potash in the dust becomes marked and may result in considerable loss of potash from the dust.

I have also found that the period of ignition may be varied from one of 20 minutes duration to one of 60 minutes duration without any decided effect on the ratio of water-soluble to total potash in the resultant product.

This procedure to increase the water-soluble potash content of cement dust has the additional advantage of a further concentration of the potash in the resultant product due to the expulsion of any water of hydration and of carbon dioxid in the undecomposed, calcium carbonate of the dust as well as the removal of unburnt coal dust. In consequence of this the water-soluble potash contained in the resultant products of the two ignitions mentioned above amounted to 11.19 per cent. and 6.10 per cent., respectively. All references to temperature in the foregoing statements and in the following claims refer to the centigrade scale.

Having thus described my process, I claim:

1. The process of treating Portland cement mill dust to increase its water-soluble potash content which consists in the ignition of the dust in an oxidizing atmosphere.

2. The process of increasing the water-soluble potash content of cement-mill dust which consists in ignition of the dust in air at a temperature below that at which volatilization of the potash takes place.

3. The method of treating cement dust, from mills using coal for fuel, to increase the water-soluble potash content which consists in ignition of the dust in an oxidizing atmosphere.

4. The process of increasing the water-soluble potash content of cement dusts which contain calcium oxid and insoluble potash silicate by ignition in an oxidizing atmosphere.

5. The method of treating cement mill dust, containing water of hydration and calcium carbonate, to increase the water-soluble potash content which consists in ignition of the dust in an oxidizing atmosphere.

6. The method of treating cement dust from mills using coal for fuel, the dust containing water of hydration, calcium carbonate and unburnt coal, which consists in ignition of the dust in an oxidizing atmosphere.

7. The method of treating cement dust to increase the water-soluble potash content which consists in ignition of the dust at temperatures from 600° to 1100°.

8. The process of increasing the water-soluble potash content of cement mill dust, which consists in heating the dust in an oxidizing atmosphere at temperatures from 600° to 1100°.

9. The method of treating cement-mill dust to increase the water-soluble potash content which consists in heating the dust in an oxidizing atmosphere from 20 to 60 minutes at temperatures between 600° and 1100°.

10. The method of treating cement dust which consists in ignition of the dust at about 1000°.

11. The method of treating cement dust to increase its water-soluble potash content, which consists in ignition of the dust for about 40 minutes at a temperature below that at which volatilization of the potash takes place.

12. The method of treating cement mill dust to increase its water-soluble potash content which consists in heating the dust for 40 minutes at temperatures between 600° and 1100°.

13. The process of increasing the water-soluble potash content of cement mill dust which consists in heating the dust in an oxidizing atmosphere for 40 minutes at about 1000°.

14. The method of separating water of hydration, and carbon dioxid from the potash content in cement dust and increasing the water-soluble potash content of the dust which consists in heating the dust at temperatures between 600° and 1100°, from 20 to 60 minutes in an oxidizing atmosphere.

15. The method of treating cement dust, from mills using coal for fuel, to increase the water soluble potash content which consists in ignition of the dust at temperatures between 600° and 1100°.

16. The method of treating cement mill dust, containing carbonaceous matter, to increase the water soluble potash content which consists in heating the dust in an oxidizing atmosphere from 20 to 60 minutes at a temperature between 600° and 1100°.

17. The method of producing water-soluble potash from dusts containing insoluble potash silicates and calcium carbonate which consists in the ignition of the dusts in an oxidizing atmosphere.

18. The method of producing water-soluble potash from dusts containing insoluble potash silicates, calcium carbonate and calcium oxid which consists in heating the dusts in an oxidizing atmosphere.

19. The method of producing water-soluble potash from dusts containing insoluble potash silicates and calcium carbonate which consists in heating the dust at temperatures from 600° to 1100° from 20 to 60 minutes.

20. The method of producing water-soluble potash from dusts containing insoluble potash silicates and calcium carbonate which consists in heating the dust in an oxidizing atmosphere from 20 to 60 minutes at temperatures from 600° to 1100°.

21. The method of producing water-soluble potash from dusts containing insoluble potash silicates, calcium carbonate and calcium oxid which consists in heating the dust in an oxidizing atmosphere from 20 to 60 minutes at temperatures between 600° and 1100°.

22. The method of producing water-soluble potash from dusts containing insoluble potash silicates and calcium oxid which consists in heating the dust from 40 to 60 minutes in an oxidizing atmosphere at a temperature between 600° and 1100°.

23. The process of producing water-soluble potash from dusts containing insoluble potash silicates and calcium oxid which consists in the ignition of the dust in an oxidizing atmosphere.

In witness whereof, I affix my signature in the presence of two subscribing witnesses.

ALBERT R. MERZ.

Witnesses:
G. L. HOFFMAN,
C. W. BOYLE.